Sept. 29, 1931.  C. FLOYD ET AL  1,825,628
MACHINE FOR CORING AND SLICING CITROUS FRUITS
Filed Oct. 21, 1929  2 Sheets-Sheet 2

Inventors
Carol Floyd
Daniel M. Smalle
by [signature]
Attorney

Patented Sept. 29, 1931

1,825,628

UNITED STATES PATENT OFFICE

CAROL FLOYD AND DANIEL M. SMALLE, OF ORLANDO, FLORIDA, ASSIGNORS TO DR. P. PHILLIPS COMPANY, OF ORLANDO, FLORIDA, A CORPORATION OF FLORIDA

MACHINE FOR CORING AND SLICING CITROUS FRUITS

Application filed October 21, 1929. Serial No. 401,061.

This invention relates to the preparation of citrous fruit for use in preserved condition in containers such as cans, and has particular reference to the coring and slicing of the fruit after the peel or skin of the fruit has been removed.

As explained in Letters Patent No. 1,759,464, issued May 20, 1930, to Philip Phillips filed June 10, 1929, Serial No. 369,925, it is desirable that the fruit prepared for canning shall be so cut that the segments of the fruit will be divided into pieces that consist not of the pulp alone but of pulp and pieces of the membranes adhering together.

The object of the present invention is to provide a machine which cores the fruit to remove the pits or seeds which are contained in those portions of the segments which meet at what may be termed the axis of the fruit, and which also cuts through the segments in a manner that severs them into pieces of combined pulp and membrane, whereby the natural flavor of the fruit is preserved better than when the membranes are entirely omitted from the canned goods.

A further object is to provide a machine capable of simultaneously coring and slicing fruit without liability of injury to the user's hands by the corer or slicing knives.

With the above objects in view, the invention consists in the construction and combination of parts substantially as hereinafter described and claimed.

Of the accompanying drawings:—

Figure 4 represents a vertical section through the sliding tube in which the fruit impaler is carried.

Figure 5 represents a section on line 5—5 of Figure 4, on a larger scale.

Similar reference characters indicate similar parts or features in all of the views.

Figure 1:
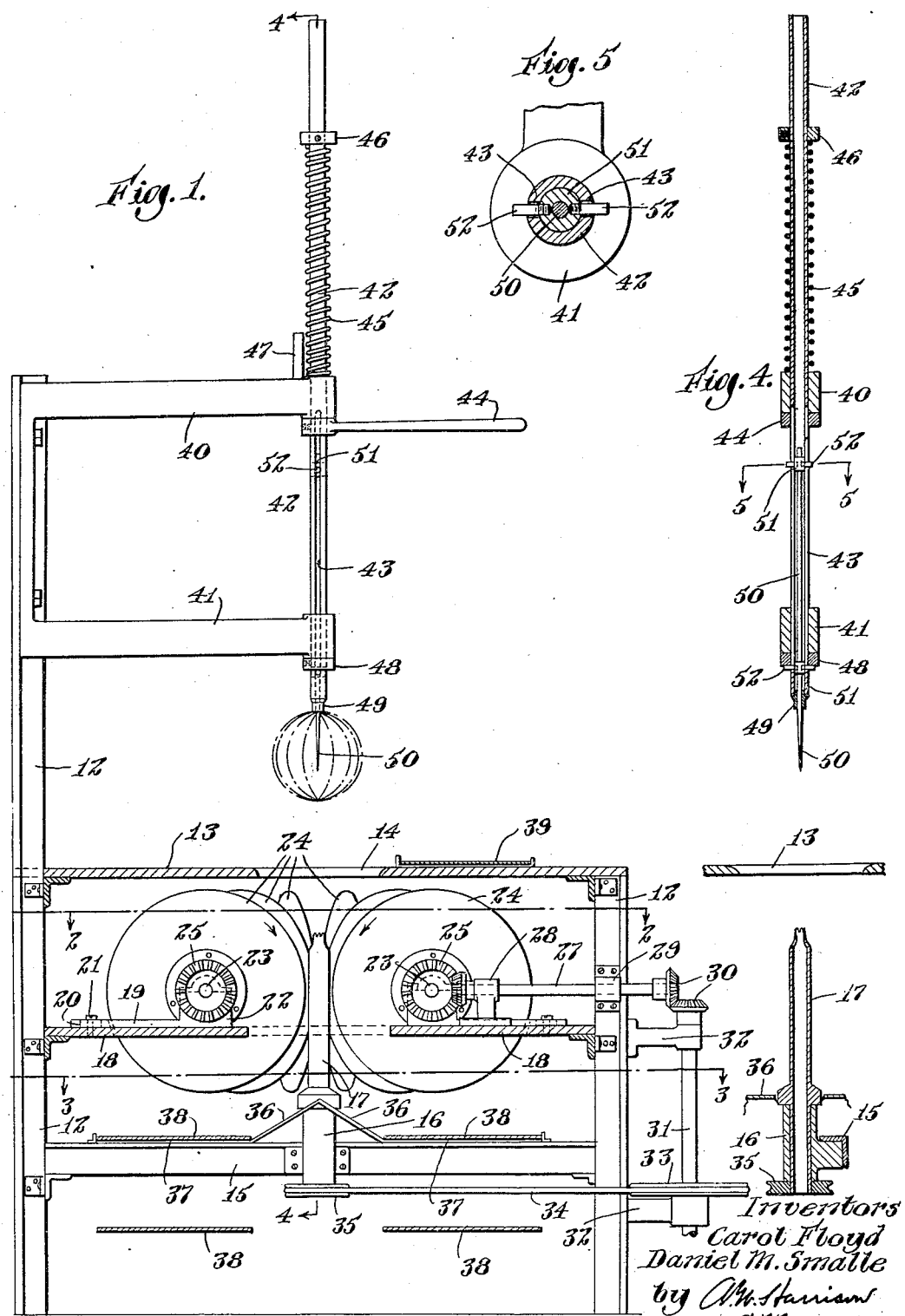
Figure 1 is a side elevation, partly in section, of our improved machine in one of its embodiments.
Figure 2:
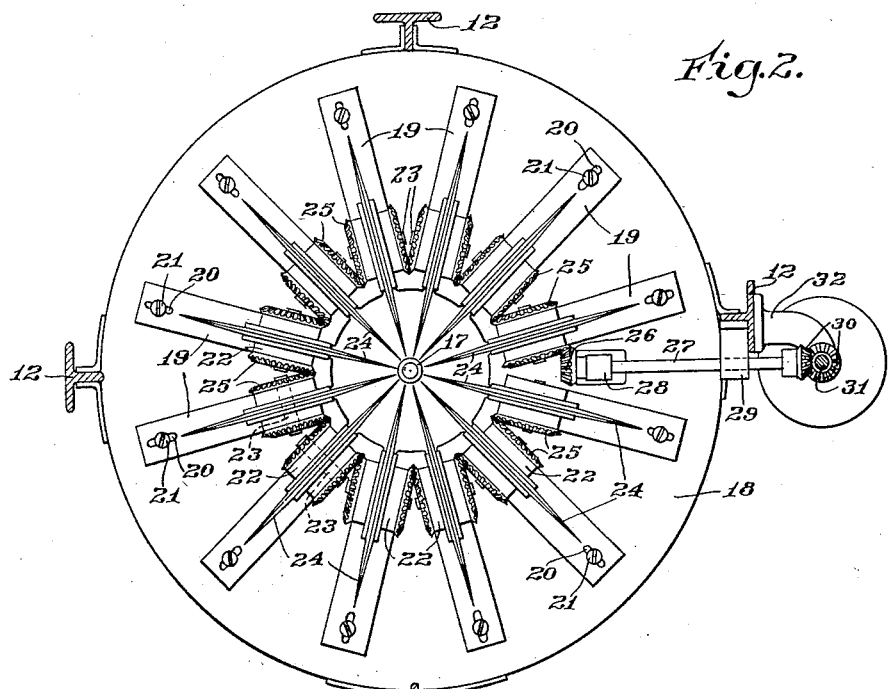
Figure 2 represents a section on line 2—2 of Figure 1.
Figure 3:
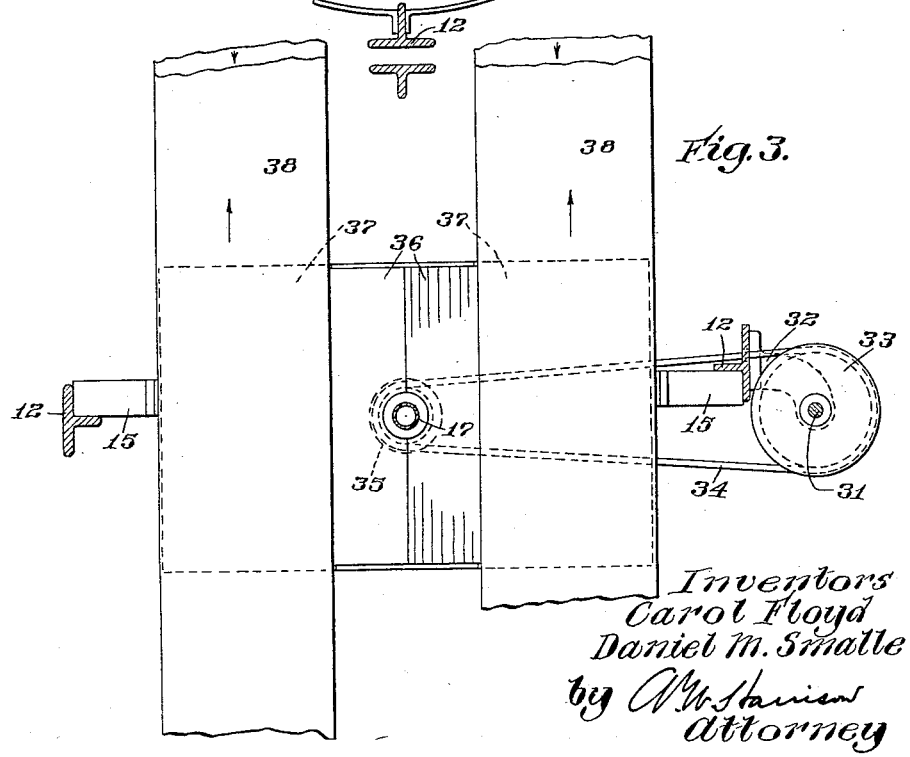
Figure 3 represents a section on line 3—3 of Figure 1.

A suitable frame for the machine is illustrated at 12, the side members of the frame being connected by a table 13 having a central aperture 14, and also connected by one or more cross bars 15 which support a vertical bearing 16 for a tubular corer 17. The upper end of the corer is preferably somewhat contracted and the upper edge thereof serrated or toothed.

Below the table 13 and supported by the frame is a shelf 18 having a central aperture. Radially mounted on the shelf 18 around its aperture are a plurality of strips 19 slotted as at 20, screws 21 passing through the slots into the shelf whereby said strips may be adjustably secured to the table for a purpose hereinafter explained.

Each strip 19 carries a bearing 22 for the shaft 23 of a circular slicing knife 24, the several shafts having intermeshing bevel gears 25. Meshing with one of the gears 25 is a bevel gear 26 carried by the inner end of a shaft 27 mounted in a bearing 28 supported by the shelf 18 and in a bearing 29 supported by one of the frame members, said shaft having a bevel gear connection 30 with a vertical power-driven shaft 31 mounted in bearings provided in frame brackets 32.

A pulley 33 carried by the shaft 31 is connected by a belt 34 with a pulley 35 connected to the lower end of the corer 17 below its bearing 16, the relative sizes of the two pulleys being preferably such that the corer is rotated at a much higher speed than the speed of rotation of the knives 24 which latter are arranged radially in a circular series surrounding the corer.

Leading in opposite directions from the bearing 17 for the corer are inclined plates 36 having horizontal portions 37 supported on the cross bar 15, said portions 37 serving to support and guide the upper runs of two belts 38. For convenience in use as hereinafter described, another belt 39 travels over the table 13.

Secured to an upwardly extending member or portion of the frame is a bracket having an upper arm 40 and a lower arm 41, the said arms having bearings in vertical alinement for the slidable tube 42 which is slotted as at 43.

An operating handle 44 is secured to the tube 42, and a spring 45 coiled around the tube is confined between the top of the arm 40 and a collar 46 secured to the tube near its upper end. A stop pin 47 rising from the arm 40 is in position to limit the lowermost position to which the tube can be forced down by its handle, said stop pin being in position to have the collar 46 contact therewith when the tube is lowered. The normal uppermost position of the tube is limited by a collar 48 secured to the tube near its lower end, the end of the bearing in the lower bracket arm 41 serving as a stop for said collar.

The lower end of the tube has a plug 49 provided with a small hole which guides the needle or fruit impaler 50 the upper end of which (Figs. 4 and 5) has a block 51 secured to it by screws 52 the outer ends of which extend out through the slots 43 of the tube and by contacting with the upper end of the lower bearing for the tube serve to limit the lowermost position which can be reached by the impaler.

The operation of the machine will now be described.

Power being applied to the shaft 31, the attendant takes a grape fruit that has been previously peeled or skinned and impales it on the needle 50 as indicated by dotted lines in Figure 1, preferably using care to have the needle occupy the axis of the fruit; that is, through the center and between the meeting edges of the segments of the fruit. We do not limit ourselves, however, to such specific location of the fruit on the impaler. The belt 39 may be employed as a carrier to bring the prepared fruit to a convenient location for the attendant to take the fruit therefrom and apply it to the impaler.

After the fruit has been impaled as just described, the operator slides the tube down by means of the handle 44, and this carries the impaled fruit down until its lower portion is mounted on the top of the corer 17. The tube can slide farther down than the impaler. The impaler moves down no farther than permitted by contact of the pins 52 with the top of the bearing in the bracket arm 41, this preventing the point of the impaler from being injured by contact with the rapidly rotating corer 17. But the tube is permitted to descend somewhat farther until its collar 46 contacts with the stop pin 47, and therefore the plug 49 at the lower end of the tube forces the fruit far enough down to ensure the coring and slicing as presently described.

As indicated in Figure 4, the lower portion as well as the upper portion of the shank of the impaler has pins 52 projecting from it through the slots of the tube, the structure being the same as illustrated by Figure 5. Such lower pins 52, by engaging the collar 48 of the tube, determine the uppermost position which the impaler can occupy in the tube. As soon as the fruit has been delivered onto the corer and pushed somewhat thereonto by the plug 49 of the tube, the operator releases the handle 44 and the spring 45 returns the tube to its normal upper position. The impaler readily rises with the tube because the action of the plug 49 has already pushed the fruit off from the impaler and the normal friction of the impaler blocks 51 with the interior of the tube will cause the impaler to rise with the tube, to be ready for another operation.

When the fruit has been delivered as described to the corer, the slicing knives immediately begin to act so that they prevent the fruit from spinning due to the rapid rotation of the corer. And the knives aid in urging the fruit down, this being due to the fact that the speed of rotation of the corer is such that said corer offers but slight resistance to downward movement of the fruit. The cored portions escape into any suitable receptacle below the lower end of the corer and the sliced fruit slides over the inclined plates 36 onto the belts 38 to be carried thereby to any suitable location for further treatment.

The reason for the adjustment of the plates or strips 19 which has been described, is that for different grades of fruit it is sometimes necessary to employ corers of different diameters. By the adjustment referred to, the knives may be shifted to positions in or from the center of the group, to best cooperate with the diameter of the corer employed.

During the operation of the machine there is practically no risk of injury to the hands of the attendant, because the table 13 so completely guards the knives and corer. The attendant need never insert the fingers through the opening 14 because the vertically movable tube and impaler provide mechanical means for effecting delivery of the fruit to the corer and slicing knives.

Having now described our invention, we claim:

1. In a machine having a rotary corer and a surrounding series of rotary knives for simultaneously coring and slicing citrous fruit, means for delivering the fruit to position to ensure operation of the corer in a path to cut the meeting edges of the segments of the fruit.

2. A machine for simultaneously coring and slicing citrous fruit, said machine having a rotary corer and a surrounding series of rotary slicing knives relatively positioned to effect removal of the meeting edges of the segments of the fruit by the corer and to effect severing of the segments into pieces including both pulp and membrane.

3. A machine for coring and slicing fruit, said machine having a group of radially arranged rotary knives, a rotary corer in the center of the group, means for causing fruit to be simultaneously operated upon by the corer and knives, means for positively rotating said knives and corer, and a pair of conveyors below the knives for receiving the sliced fruit, said conveyors being spaced to permit the escape of material from the corer.

In testimony whereof we have affixed our signatures.

CAROL FLOYD.
DANIEL M. SMALLE.